United States Patent
Kraska et al.

(10) Patent No.: US 6,231,479 B1
(45) Date of Patent: May 15, 2001

(54) CLOSED-LOOP ELECTRONIC CONTROLLER FOR APPLYING TRANSMISSION FRICTION CLUTCHES

(75) Inventors: Marvin Paul Kraska, Dearborn; Steven George Malson, Metamora; Walter Joseph Ortmann, Ypsilanti, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/427,903

(22) Filed: Oct. 27, 1999

(51) Int. Cl.$^7$ .............................. F16H 61/04; F16H 61/06
(52) U.S. Cl. ........................................... 477/143; 477/155
(58) Field of Search ...................................... 477/143, 155

(56) References Cited

U.S. PATENT DOCUMENTS

| | | | |
|---|---|---|---|
| 4,922,424 | * 5/1990 | Hiramatsu | 477/155 X |
| 4,938,097 | 7/1990 | Pierce . | |
| 4,951,200 | * 8/1990 | Leising et al. | 477/148 X |
| 5,179,875 | * 1/1993 | Brown | 477/155 X |
| 5,188,005 | * 2/1993 | Sankpal et al. | 477/155 X |
| 5,272,630 | 12/1993 | Brown et al. . | |
| 5,389,046 | 2/1995 | Timte et al. . | |
| 5,505,675 | * 4/1996 | Kuriyama et al. | 477/143 X |
| 5,776,030 | * 7/1998 | Minowa et al. | 477/143 X |
| 5,842,950 | * 12/1998 | Tsutsuie et al. | 477/143 |
| 5,919,114 | * 7/1999 | Kamada et al. | 477/143 X |

* cited by examiner

Primary Examiner—Charles A Marmor
Assistant Examiner—Roger Pang
(74) Attorney, Agent, or Firm—Frank G. McKenzie

(57) ABSTRACT

A torque-based clutch engagement controller for achieving smooth friction clutch engagement in a multiple-ratio transmission for an automotive vehicle driveline comprising a torque measuring circuit that determines torque inputs for the controller as a function of measured engine torque and turbine acceleration, means for determining the torque commanded by the vehicle operator as a function of engine throttle position, means for comparing the desired torque commanded by the operator to the input torque values, and means for converting the torque values to a pressure value as a function of the difference between the desired torque and the input torque whereby the pressure developed by the system applies a friction clutch so that engagement of the clutch occurs rapidly with optimum smoothness.

4 Claims, 4 Drawing Sheets

| GEAR | RC | CC | FC | DC | L/R | 2/4 | OWC2 DR | OWC2 CO | OWC1 DR | OWC1 CO | RATIO | COAST BRAKING |
|---|---|---|---|---|---|---|---|---|---|---|---|---|
| M-1 |  | X | X |  | X |  | X | - | X | - | 2.889 | YES |
| M-2 |  | X | X |  |  | X | X | - | OR | OR | 1.571 | YES |
| M-3 |  | X | X | X |  |  | X | - | OR | OR | 1.000 | YES |
| 1st |  |  | X |  |  |  | X | OR | X | OR | 2.889 | NO |
| 2nd |  |  | X |  |  | X | X | OR | OR | OR | 1.571 | NO |
| 3rd |  |  | X | X |  |  | X | OR | OR | OR | 1.000 | NO |
| 4th |  |  | X | X |  | X | OR | OR | OR | OR | .689 | YES |
| REV | X |  |  |  | X |  | - | - | - | - | 2.310 | YES |

CLOSED-LOOP ELECTRONIC CONTROLLER FOR APPLYING TRANSMISSION FRICTION CLUTCHES

TECHNICAL FIELD

A friction clutch engagement controller for developing engagement pressure for a clutch in a multiple-ratio power transmission mechanism.

BACKGROUND OF THE INVENTION

It is conventional design practice to use a hydrokinetic torque converter in an automotive vehicle driveline between an internal combustion engine and multiple-ratio gearing. The torque flow path through the gearing is interrupted when a forward clutch or a reverse clutch for the gearing is released.

If the friction clutches of the transmission remain applied when the vehicle engine is operated at zero throttle (i.e., the engine idles), the idle state causes the hydrokinetic torque converter to function as a neutral clutch as the turbine of the converter is stationary and the impeller of the converter is driven at engine idle speed. This loading of the torque converter creates a hydrokinetic parasitic loss that degrades driveline efficiency.

The present invention is capable of being used in a multiple-ratio gearing system of the kind shown, for example, in U.S. Pat. No. 5,389,046. Such transmissions typically do not have the ability to achieve a neutral idle state since the forward and reverse clutches are applied with a relatively high line pressure, even with the engine idling. With the engine throttle closed and the engine idling, the line pressure for such conventional control systems may be 50 psi, for example. The forward drive clutch or the reverse drive clutch thus is fully engaged when the engine throttle is closed.

Attempts have been made to cause the clutch to be operated in a continuously slipping state during neutral idle. An example of a transmission control system intended to function in this fashion is described in U.S. Pat. No. 5,272,630, which discloses a neutral idle control for unloading the converter to eliminate undesirable noise, vibration and harshness in the driveline when the engine is idling and the transmission is in the drive mode. Another transmission control system with a neutral idle feature is described in copending patent application Ser. No. 09/410,918, filed Oct. 1, 1999. That copending patent application is assigned to the assignee of the present invention. These prior disclosures are incorporated herein by reference, and reference to them may be made to supplement the present disclosure.

It is necessary in a control system with a neutral idle feature to complete the clutch engagement relatively quickly following termination of the neutral idle mode, but this must be done with minimal driveline disturbance. It is necessary as well to avoid excessive slipping during clutch engagement in order to maintain clutch durability. A short engagement time is desirable to achieve maximum clutch durability, but smoothness in the engagement suggests that a long engagement time should be used.

It is possible to apply a slipping clutch rapidly by using an electronic controller that uses a closed-loop control method based upon turbine speed and impeller speed as input variables. Another possible control method of this type may use clutch pressure that is incremented during clutch engagement based on estimated converter torque. Such control methods, however, are not capable of providing smooth clutch application at all engine throttle settings within a desired, short engagement time.

BRIEF DESCRIPTION OF THE INVENTION

It is an objective of the invention to provide an electronic controller for engaging a friction drive clutch for a multiple-ratio transmission during a neutral-idle operating mode wherein the controller provides a desirable compromise between the requirement for extending clutch engagement time to achieve clutch engagement smoothness, and the requirement for reducing clutch engagement time to maintain clutch durability.

The invention achieves the foregoing objective by estimating the actual clutch torque based on engine speed and turbine speed measurements and by comparing that torque to a so-called desired torque. Clutch pressure is modulated as a function of the difference between the desired torque and the estimated torque (i.e., the error).

The controller also responds to changes in engine torque based on a change in engine throttle position. That change in torque is anticipated by using a torque feed-forward term to modify the desired torque.

The control system includes a means for estimating engine torque input and torque input shaft acceleration. Functional relationships between engagement time and neutral idle torque and between engine throttle position and engine torque input are stored in software and used to establish a desired clutch torque. Rotary inertia torque is computed as a function of measured engine torque. A clutch pressure is established based upon the error between the sum of the rotary inertia torque and measured torque values, and the value of the desired torque.

PARTICULAR DESCRIPTION OF THE INVENTION

Figures 1, 1A:
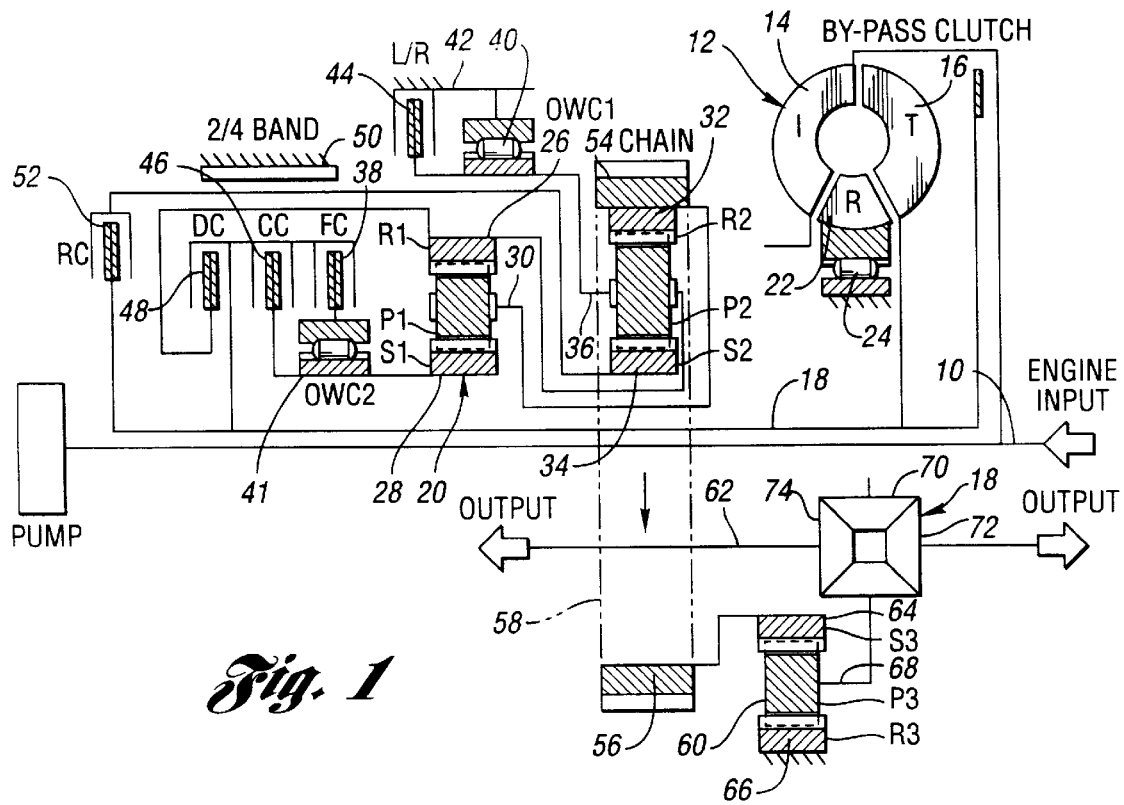
FIG. 1 is a schematic representation of a gear system and a torque converter used in an automotive vehicle driveline.
FIG. 1a is a chart that shows the clutch and brake engagement and release pattern for the clutches and brakes used in FIG. 1 to obtain various driving ratios.

The transmission that embodies the present invention is schematically illustrated in FIG. 1. For a full description of the transmission of FIG. 1, reference may be made to U.S. Pat. No. 4,938,097.

In FIG. 1, numeral 10 designates a torque input shaft, which may be connected to the crankshaft of an internal combustion engine for an automotive vehicle. A hydrokinetic torque converter 12 includes an impeller 14 connected drivably to the input shaft 10. A turbine 16 of the torque converter 12 is connected to a torque input shaft 18 for multiple-ratio gearing 20.

A bladed reactor or stator 22 is situated at the flow exit side of the turbine and the flow entrance side of the impeller. It is mounted on an overrunning brake 24 to provide a hydrokinetic torque reaction, which results in a hydrokinetic torque multiplication in well known fashion when the torque converter is in a hydrokinetic torque multiplication mode as the engine torque is multiplied by the torque ratio of the converter to produce a higher turbine shaft torque.

The gearing 20 comprises a pair of simple planetary gear units. The first gear unit includes a ring gear 26, a sun gear 28 and planetary pinions supported on a planetary carrier 30. The gearing 20 includes also a second simple planetary gear unit that includes ring gear 32, sun gear 34, and planetary pinions journalled on carrier 36.

Torque is delivered from the turbine shaft 18 through forward clutch 38 and through overrunning coupling 41 to the sun gear 28 of the first planetary gear unit 20. The carrier 36 of the second planetary gear unit serves as a reaction member since it is braked by overrunning brake 40 during operation in the lowest forward-driving speed ratio. Brake 40 distributes reaction torque to the transmission casing 42. A friction brake 44 is arranged in parallel relationship with respect to the overrunning brake 40 to effect torque transfer to the casing in either direction. This brake accommodates coast braking during operation in the lowest forward-driving ratio. A coast clutch 46 is arranged in parallel relationship with respect to overrunning brake 41 and accommodates torque transfer in either direction between the turbine shaft 18 and the sun gear 28.

Direct clutch 48, when it is engaged, connects turbine shaft 18 to ring gear 26. Forward clutch 38 and direct-drive clutch 48 are engaged simultaneously to effect direct-drive ratio in the gearing. Clutches 38 and 48 are engaged also simultaneously with friction brake band 50 during operation of the transmission in the fourth driving ratio, which is an overdrive ratio. Friction brake band 50 anchors sun gear 34 to provide a reaction point for the gearing during overdrive operation.

A reverse clutch 52 connects the turbine shaft 18 to the sun gear 34 of the second planetary gear unit during reverse drive. Friction brake 44 also is applied during reverse drive. The sun gear 34 thus acts as a torque input gear element with the carrier 36 anchored. The ring gear 32 is driven in the reverse direction.

The ring gear 32 acts as a torque output element during forward drive as well as reverse drive. It is connected directly to a chain sprocket 54. Output sprocket 56 is connected to the sprocket 54 by drive chain 58.

A final drive gear unit 60 is arranged on torque output axis 62. Sprocket 56 is connected directly to sun gear 64 of final drive gear unit 60. Ring gear 66 of the gear unit 60 is connected to the transmission case. Carrier 68 rotatably supports planetary pinions for the final drive gear unit 60. Carrier 68 drives a differential carrier housing, which rotatably supports differential pinions 70. Each pinion 70 engages a separate side gear as shown at 72 and 74. Torque output shafts extending to axle half shafts of traction wheels of the vehicle are connected to the side gears 72 and 74 in known fashion.

FIG. 1a shows the engagement and release pattern for the clutches and brakes illustrated schematically in FIG. 1. Reverse clutch 52 is identified in FIG. 1a by the symbol RC. The direct clutch 48 is identified by the symbol DC. The coast clutch 46 is identified by the symbol CC. The forward clutch 38 is identified by the symbol FC. The low-and-reverse brake 44 is identified by the symbol L/R. The friction brake band 50 is identified by the symbol 2/4. Overrunning coupling 40 is identified by the symbol OWC1, and overrunning clutch 41 is identified by the symbol OWC2.

The symbol OR in FIG. 1a is used to designate a coupling that is overrunning, and the symbol X is used to indicate an applied clutch or brake.

Figure 2:
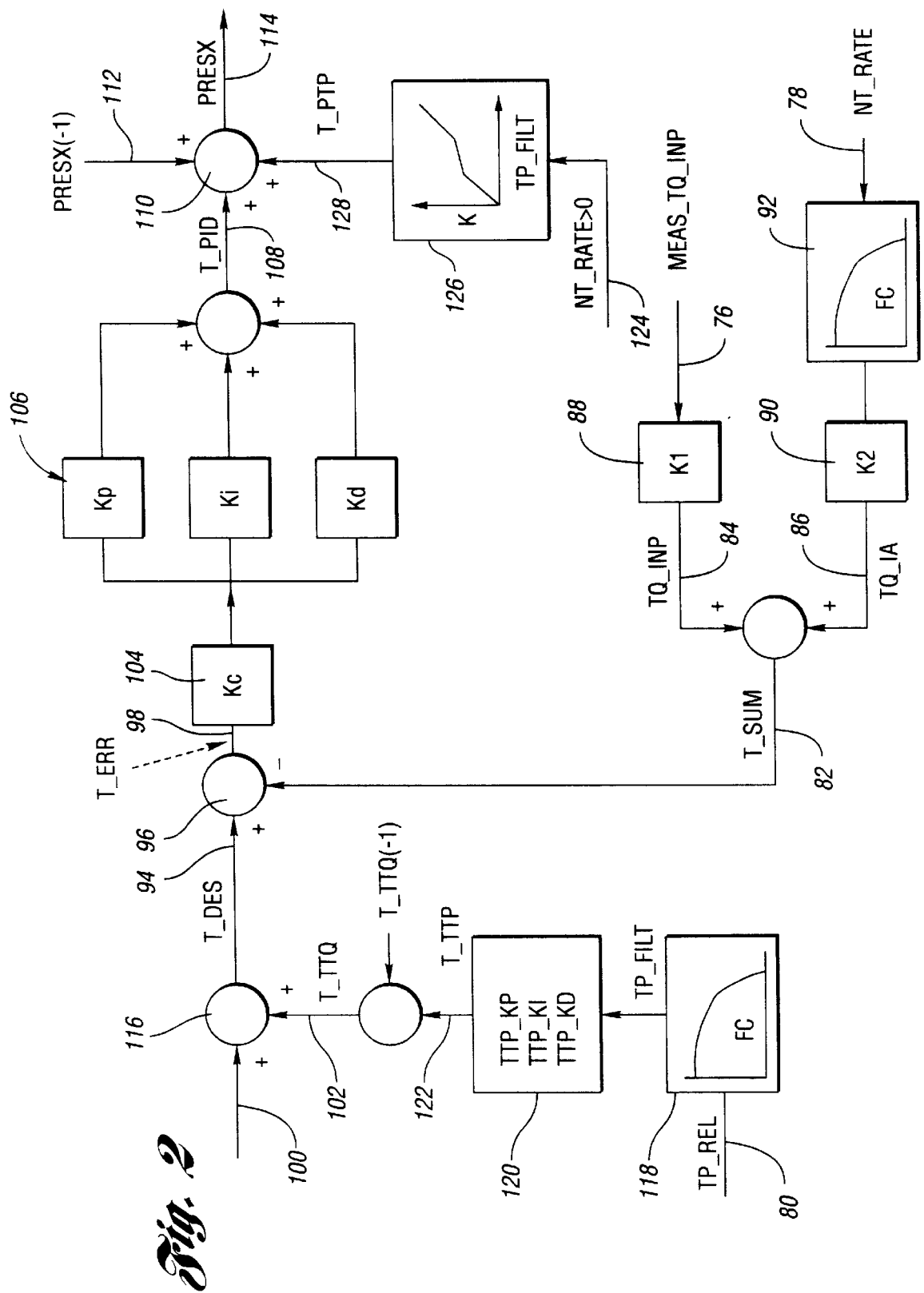
FIG. 2 is a schematic representation in block diagram form of a control system using a torque-based lock up controller for a friction clutch in a transmission of the kind shown in FIG. 1.

The control system shown in FIG. 2 uses three measured inputs. The first measured input is the measured torque at 76. The second measured input is the turbine acceleration, as shown at 78. The third measured input is the throttle position signal shown at 80.

The measured torque (MEAS_TQ_INP) is derived from the direct measurements of engine speed and turbine speed. Suitable speed sensors of known design can be used for this purpose. Since the engine speed is equal to the speed of the impeller of the torque converter 12, the speed ratio of the torque converter can be determined. The steady-state size factor or "K" factor, which is equal to impeller speed divided by the square root of impeller torque, and the torque ratio of the transmission are known as functions of speed ratio. These terms can be obtained using dynamometer data for the torque converter. They are used in determining turbine torque as expressed by the following equation:

$$T\_torque = (N\_engine/K\_factor)^2 * T\_ratio.$$

Turbine acceleration can be obtained by taking the first derivative of the measured turbine speed. The throttle position signal at 50 can be measured directly. The total torque (T_SUM) at the clutch, as shown at 82, is the sum of the steady-state torque (TQ_INP) and the dynamic torque (TQ_IA), shown respectively at 84 and at 86.

The steady-state torque is obtained by using a gain factor K1 at 88, which represents the ratio of turbine torque that the control clutch holds. That is, K1 represents the clutch torque divided by the turbine torque at any instant during the engagement interval. The gain factor K2, shown at 90 in FIG. 2, is the effective rotating inertia constant, which is used to multiply the filtered turbine speed value at 78. The filtering circuit, which uses a filtering function stored in memory, is schematically represented at 92.

The desired torque is shown in FIG. 2 at 94. The torque at 82 (T_SUM) is transferred through a signal flow path to summing point 96. At the beginning of the clutch engagement routine, the desired torque (T_DES) is initialized so that it is equal to the value of torque at 82 (T_SUM). During the clutch engagement interval, the value T_SUM is compared to T_DES to detect any error at 98. The error is designated as T_ERR.

Figure 2A:
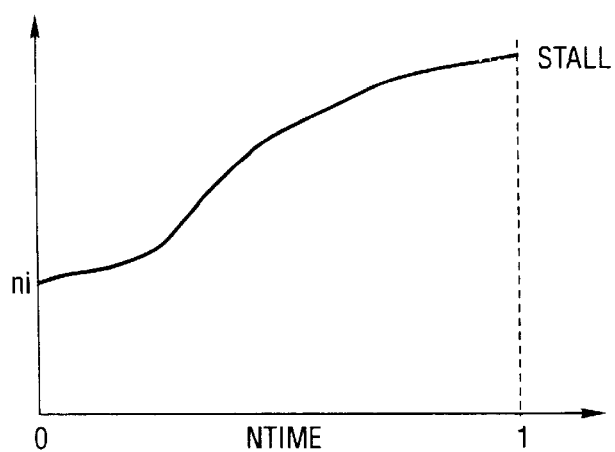
FIG. 2a is a plot showing the relationship between neutral idle torque and a normalized engagement time.
Figure 2B:
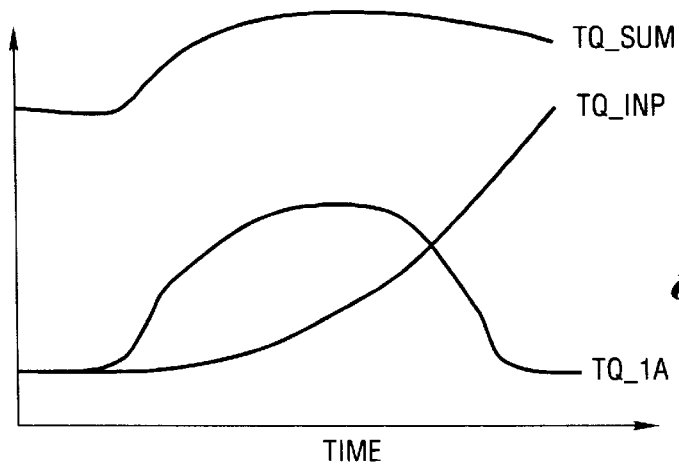
FIG. 2b is a plot showing the relationship between engagement time and measured torque input, inertia torque input and the sum of the measured and inertia torque inputs.

The desired torque is profiled based upon the error at 98 so that it reaches a level of torque that the clutch will be required to hold to complete the engagement. The profile must be completed within a calibratable engagement time. As seen in FIG. 2a, the shift time is normalized to obtain a variable called "NTIME". This is done by dividing the engagement time by the desired shift time. When the value for NTIME reaches one, as seen in FIG. 2a, the engagement time is equal to the desired shift time. At that instant, the shift should be complete. In the event that the shift is not complete, however, the desired torque continues to ramp up as a safety precaution to make sure that the shift is completed.

In FIG. 2a, the ordinate (ni) is neutral idle torque for the engaging clutch. The value for neutral idle torque that is obtained using the function of FIG. 2a is the torque input at 100 in FIG. 2. The value of desired torque at 64 is changed depending upon the value of the total throttle torque (T_TTQ) shown at 102.

Figure 3:
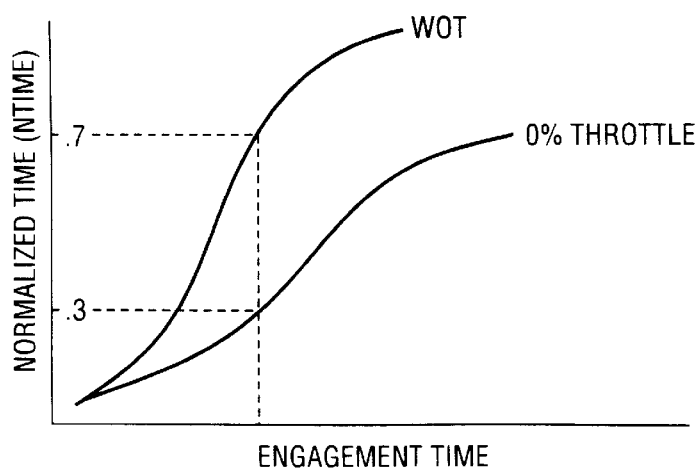
FIG. 3 is a plot showing the actual engagement time versus desired engagement time at both engine wide-open throttle and at a zero throttle.

FIG. 3 is a plot of the relationship of actual engagement time and normalized time at idle as well as at wide-open throttle. A family of similar curves for intermediate throttle settings would fall between the curves for wide-open throttle and closed throttle. The term NTIME in FIG. 2a is plotted in accordance with a function in software as follows: NTIME=actual engagement time divided by desired shift time. Thus, this single table in software can be used for all throttle settings, which reduces the complexity of the software.

At a given engagement time for zero throttle (see FIG. 3), for example, the NTIME value may be 0.3, assuming NTIME=1 upon completion of the engagement. Further, the NTIME value may be 0.7 for full throttle operation. These values take into account the need to have fast engagement time to achieve good clutch durability while having longer engagement time to achieve smoothness in clutch engagement.

The desired torque, which is the torque at 100 modified by the torque at 102, determines the error at 98. That error then is multiplied by the overall gain $K_c$ as shown at 104, which converts the torque to a pressure value.

A proportional-integral-derivative controller of conventional design, which contains the terms $K_p$, $K_i$ and $K_d$ as indicated at 106, increments the pressure value. In this way, the amount of the increment (T-PID) for the controller is determined. The three outputs for the PID controller are summed to develop an increment at 108. This increment is added at summing point 110 to the pressure command at 112 (PRESX-1) for the immediately preceding control loop of the processor. In this way, a current pressure command is developed at 114.

If the throttle opening changes during the engagement interval, the desired torque shown at 100 would not be an accurate indicator of desired torque. It is necessary, therefore, to add to the summing point 116 a modified torque to account for the effect of a throttle change. The throttle position signal at 80 is filtered at 118 to provide a filtered value TP_FILT using a filtering function stored in memory at 118. The value TP_FILT then is multiplied by a proportional-integral-derivative term at 120 to obtain an incremental change in the throttle torque value. This is shown at 122. The value T_TTP is added to the previous total throttle torque in the preceding control loop of the processor, as shown at T_TTQ(-1). This produces a new value for the throttle torque T_TTQ. The throttle torque is added to the profiled torque at 116 to obtain the desired torque at 94.

If a positive acceleration of the turbine is detected at 78 (i.e., NT_RATE), that would indicate that the clutch pressure is too low and that the clutch is slipping or that the shift is complete. A value for NT_RATE that is not greater than zero would indicate that the shift is progressing and that the turbine is accelerating normally during the engaging interval as the vehicle speed increases. If the value NT_RATE is greater than zero, as indicated at 124, the positive turbine acceleration is multiplied by a gain factor K at 126 to obtain a pressure value T_PTP as shown at 128. The gain factor is an empirical function of filtered throttle torque (TP_FILT). The value (T_PTP) is added to the other values at 112 and 108 to produce a modified pressure value at 114.

The value at 128 is zero if the acceleration of the turbine is normal. If the acceleration is above zero, which would indicate that the controller may be losing control over the turbine speed or that the shift is complete, the pressure value at 128 will result in a higher pressure value at 114. At higher throttle positions, which would result in a higher gain factor at 126, the value for T_PTP is increased accordingly.

Figure 4:
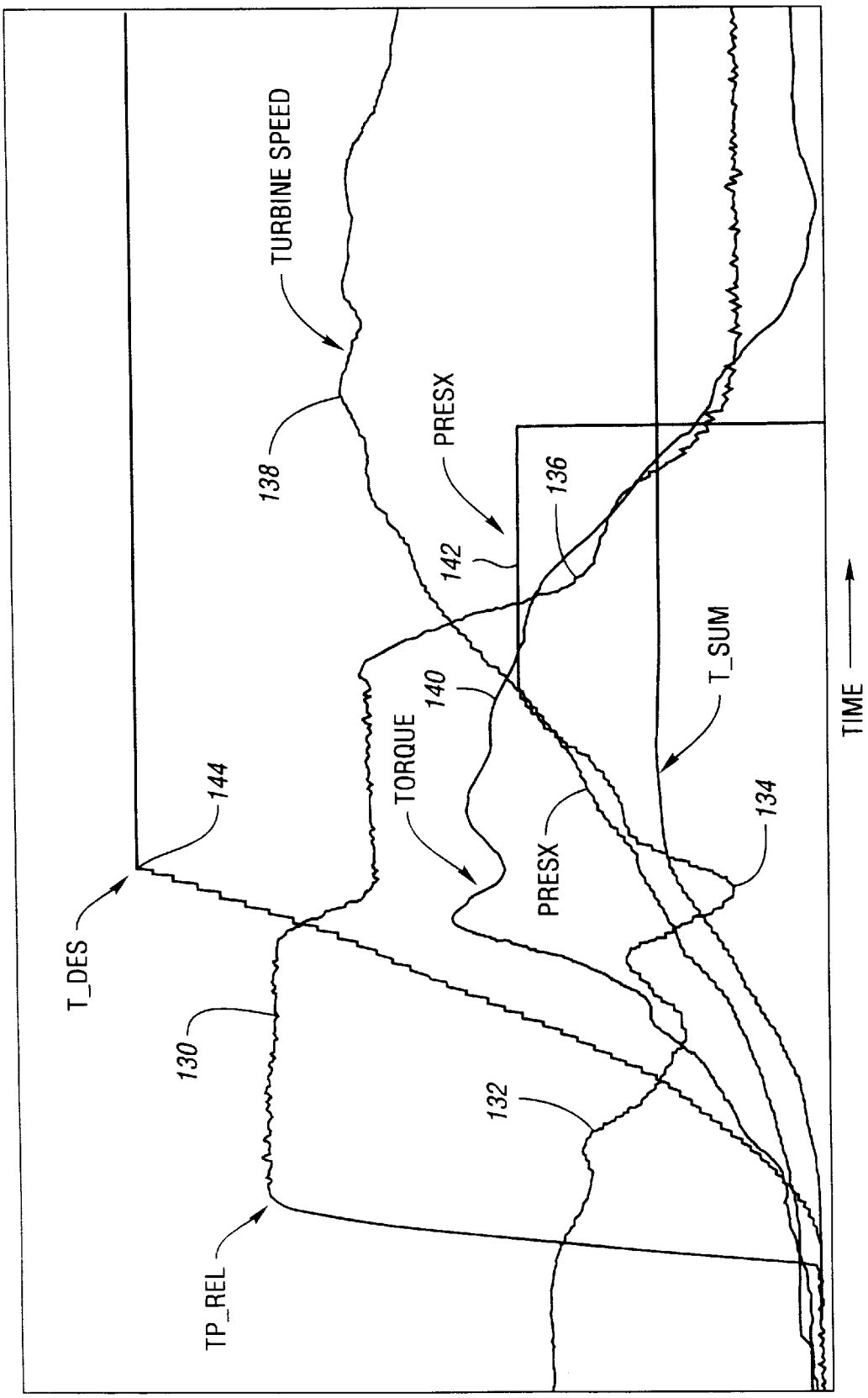
FIG. 4 is a plot of the various control variables for the control system as a function of clutch engagement time.

FIG. 4 is a plot of the variables discussed in the preceding description as a function of engagement time. In FIG. 4, the throttle position, represented by the variable TP-REL, is increased to effect engagement following the neutral idle mode. The plot of that variable rises rapidly and levels off at 130. The turbine speed decreases as shown at 132 until the engagement is complete. This occurs when the turbine speed is at or near its low point, as shown at 134.

As the operator backs off the throttle, as shown at 136, the turbine speed increases less rapidly and then levels off as shown at 138. After the clutch is fully engaged, the turbine speed is a direct indicator of vehicle speed.

The torque at the wheels is shown at 140. After rising to its highest value, the torque at the wheels decreases as the engine throttle is backed off.

The value for clutch pressure (PRESX) increases to a maximum value as shown at 142. The clutch is engaged fully before that point is reached.

The desired torque (T_DES) increases as the throttle position increases until it reaches a maximum at 144. That maximum value occurs at a time in the engagement interval when the shift is complete (i.e., at or near the low point 134).

Although a preferred embodiment of the invention has been disclosed, modifications may be made by persons skilled in the art without departing from the scope of the invention. All such modifications and equivalents thereof are included within the scope of the following claims.

What is claimed is:

1. A control system for an automatic power transmission having multiple-ratio gearing elements for delivering torque from a throttle controlled interval combustion engine to a driven shaft in an automotive vehicle driveline;

pressure actuated clutch means and brake means for controlling relative motion of the gearing elements to establish multiple forward driving torque flow paths and a reverse drive torque flow path, the clutch means including a torque input shaft;

means for measuring engine torque input to the system;

means for measuring torque input shaft acceleration;

an electronic processor means for activating and deactivating the clutch means and brake means including memory registers that store predetermined functional relationships between engagement time for the clutch means and engine neutral idle torque and between engine throttle position and engine torque input to the system;

means for establishing a desired engine torque input to the system using engine throttle torque and engine neutral idle torque;

means for establishing rotary inertia torque as a function of measured engine torque;

means for computing the sum of the values for rotary inertia torque and the measured engine torque, desired torque being compared to the sum to determine an error between them; and means for conveying the error to an incremental clutch pressure value to complete engagement of the clutch means quickly with minimal driveline torsional disturbance.

2. A control system for an automatic power transmission having multiple-ratio gearing elements for delivering torque from a throttle-controlled internal combustion engine to a driven shaft in an automotive vehicle driveline, the driveline including a hydrokinetic torque converter with an impeller connected to the engine and a turbine connected to a torque input gearing element of the transmission;

pressure-actuated clutch means and brake means for controlling relative motion of the gearing elements to establish multiple forward driving torque flow paths;

means for measuring engine torque input to the system;

means for measuring torque converter turbine acceleration;

an electronic processor for activating and deactivating the clutch means and brake means including memory registers that store predetermined functional relationships between engagement time for the clutch means and engine neutral idle torque and between engine throttle position and engine torque input to the system;

means for establishing a desired engine torque input to the system using engine throttle torque and engine neutral idle torque;

means for establishing rotary inertia torque as a function of measured engine torque;

means for computing the sum of the values for rotary inertia torque and the measured engine torque, desired torque being compared to the sum to determine an error between them; and means for converting the error to an incremental clutch pressure value to complete engagement of the clutch means quickly with minimal driveline torsional disturbance.

3. The control system as set forth in claim 1 including means for measuring the acceleration of the torque input shaft during an engagement interval for the clutch means;

the electronic processor memory registers storing an empirical, functional relationship between positive acceleration of the torque input shaft and a filtering constant; and means for increasing the actuating pressure for the clutch means as a function of the filtering constant.

4. The control system as set forth in claim 2 including means for measuring the acceleration of the turbine during an engagement interval for the clutch means;

the electronic processor memory registers storing an empirical, functional relationship between positive turbine acceleration and a filtering constant; and means for increasing the actuating pressure for the clutch means as a function of the filtering constant.

* * * * *